Sept. 1, 1964  M. H. NICKERSON  3,147,201
APPARATUS FOR VAPOR COMPRESSION DISTILLATION
Filed Jan. 28, 1959  3 Sheets-Sheet 1

Inventor
Malcolm H. Nickerson
by Roberts, Cushman & Grover
Att'ys

Sept. 1, 1964  M. H. NICKERSON  3,147,201

APPARATUS FOR VAPOR COMPRESSION DISTILLATION

Filed Jan. 28, 1959  3 Sheets-Sheet 3

Inventor
Malcolm H. Nickerson
by Roberts, Cushman & Grover
Attys

United States Patent Office 3,147,201
Patented Sept. 1, 1964

3,147,201
APPARATUS FOR VAPOR COMPRESSION
DISTILLATION
Malcolm H. Nickerson, 11 Waring Road, Natick, Mass.
Filed Jan. 28, 1959, Ser. No. 789,646
2 Claims. (Cl. 202—187)

This invention relates to improvements in process and apparatus for vapor compression distillation and relates more particularly to improvements in the economical recovery of purified water from sea water and the like.

It is the primary object of this invention to provide an improved method and apparatus for the economical recovery of purified solvents from solutions. Further objects include the provision of apparatus which will utilize natural gravitational currents to remove concentrated solution from the evaporation chamber, which is very compact in relation to its capacity, which is readily assembled and disassembled, which is efficient in conserving heat, wherein the evaporation chamber is simply and efficiently sealed, and which utilizes a single vacuum pump or compressor to raise the solution to the evaporation chamber; to lower the saturation temperature of the solution; and to compress vapors evolved from the solution to provide the heat necessary for continuous evaporation.

In accordance with this invention, these and other desirable objects are achieved with distilling apparatus which comprises a riser open at both ends, the lower end of said riser being below the surface of a source of supply of liquid solution to be distilled, an evaporation chamber mounted over said riser, the top of the riser opening to the bottom of said chamber, a compressor having inlet means for receiving vapors from said chamber, said compressor maintaining a sub-atmospheric pressure in said chamber, the combined height of said riser and chamber above the surface of said source being greater than the height of the column of solution which can be maintained therein by atmospheric pressure acting on said source, drive means for said compressor, heat-exchanger means in said chamber having a substantial portion thereof submerged in the solution within said chamber, said compressor having discharge means feeding compressed vapors to said exchanger, and means for withdrawing condensed vapors from said exchanger, said riser being adapted to return concentrated solution from said chamber to said source by means of natural gravity-induced currents.

Preferably the heat-exchanger is adapted to feed condensed vapors to a conduit descending within said riser; the solution source is a naturally-occurring source; atmospheric pressure is the sole force maintaining solution within said chamber; the riser, conduit, compressor, and chamber have a common vertical axis; the compressor and chamber are mounted and sealed to opposite sides of a heavy plate assembly or septum which carries the entire weight of the assembled apparatus; and the seals between the plate assembly and the compressor and chamber constitute the only removable vacuum seals within the apparatus.

In a further aspect this invention includes, in the method of vapor compression distillation, the improved steps of forcing solution into the evaporation chamber by means of atmospheric pressure acting on a source of solution, and continuously removing concentrated solutions from the evaporation chamber to said source by means of natural, gravity-induced currents.

This invention may be better understood by reference to embodiments illustrated in the accompanying drawings wherein.

Figure 2:
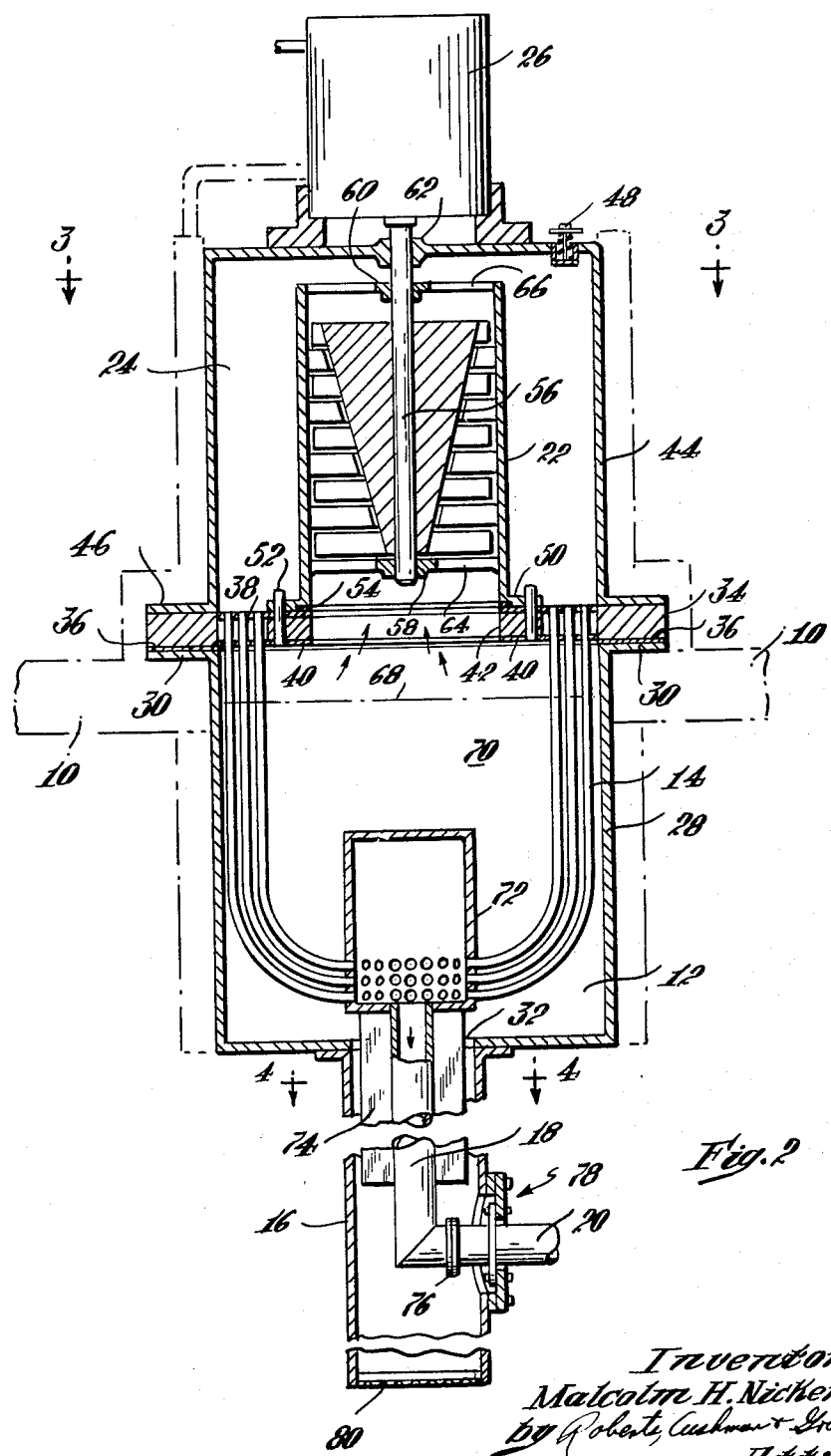
FIG. 2 is a diametrical vertical section of a distilling unit according to one embodiment of this invention.

Referring to the drawings, FIG. 2 illustrates a distilling unit according to one embodiment of the invention which comprises a support 10 (indicated in broken lines), an evaporation chamber 12, heat-exchanger tubes 14, a vertical riser 16, coaxial with said chamber and equipped with an intake screen 80, a conduit 18, a condensate discharge pipe 20, a compressor 22, a vapor chamber 24, and a compressor drive motor 26.

For convenience a structure generally like that of FIG. 2 and which defines the several chambers within which the process is carried out, may herein, at times, be referred to as a "tower," said tower being closed at its upper end and open to the source at its lower end and being of a height which exceeds the height of the maximum barometric column of the liquid to be treated.

The support 10 is a part of a supporting structure which may be anchored directly to the ground, to a portable unit, or to a floating base as desired. The shell 28 forming the evaporation chamber 12 is secured to the support 10; has a radial flange 30 resting thereon; and has an opening 32 providing communication between chamber 12 and the interior of the vertical riser 16.

The flange 30 is joined to a heavy metal ring 34 concentric with the evaporation chamber 12. A gasket 36 is placed between the flange 30 and the ring 34 to form a vacuum seal for the evaporation chamber 12. Two annular tube sheets 38 and 40 are secured leak-tight to the ring 34 and are separated at their inner portions by a second heavy metal ring 42. The ends of the tubes 14 are secured leak-tight to the tube sheets 38 and 40 to form a cellular structure of great strength. The assembly comprising the rings 34 and 42, the ends of the tubes 14 and the tube sheets 38 and 40 form a rigid plate assembly or septum of sufficient strength to support the weight of the entire apparatus and to transmit it to the support 10. In addition, this structure is relatively easy to seal against leakage thereby to maintain a vacuum within the chamber 12.

The vapor chamber 24 is formed by shell 44 which has a radial flange 46 at its lower end which is firmly secured to the ring 34. The compressor 22, schematically shown in FIG. 2, is mounted entirely within the vapor chamber 24 and has a radial flange 50 at its lower end which is secured to the inner margin of the tube sheet 38 by means of bolts 52. The flange 50 is sealed to the sheet 38 by means of a gasket 54. Preferably, and as shown in FIG. 2, the compressor 22 is a rotary compressor having a shaft 56 supported by bearings 58 and 60 and which is turned by the motor drive means 26 mounted concentrically on top of shell 44. The compressor drive shaft 56 passes through a seal 62 mounted in the top of shell 44. While a reciprocating compressor may be used, a centrifugal compressor is preferred since it has only a single moving part and because it can be operated at very high speed. By reason of its high speed, a centrifugal compressor may be of small diameter in comparison with its capacity, thus occupying so little space as to provide the largest possible tube area in sheets 38 and 40. A simple gas turbine drive is also preferred since it is light in weight and operates at the high speed required for a centrifugal compressor. An automatic, vacuum-breaking valve 48, at the top of compressor chamber 24, acts to maintain the desired operating pressure within the chamber.

The compressor bearings 58 and 60 are supported by spiders 64 and 66, respectively, at the compressor inlet and outlet. If desired, a conventional crown shield (not here shown) may be mounted at the compressor inlet several inches above the surface 68 of the boiling liquid within the evaporation chamber 12 to limit the entry of liquid and solid matter into the compressor.

The tubes 14 descend from the sheets 38 and 40 in the evaporation chamber 12; extend through a substantial depth of the solution 70 within said chamber and have their lower ends sealed to a header 72. The lower end of the header 72 is joined and sealed to the conduit 18 which descends within the riser 16. The conduit 18 is provided with vertical radial fins 74 to increase its heat exchange efficiency and is connected by a flanged coupling 76 to a horizontal condensate discharge pipe 20 near the bottom of the riser 16 but above the surface of a source of solution supply in which the bottom of the riser 16 is immersed. The discharge pipe 20 passes through a sealing assembly 78 in the riser wall to provide easy access to the coupling 76.

When the driver 26 is a motor producing hot exhaust gases, these gases may be utilized to heat the evaporation chamber 12 and the vapor chamber 24. This can be accomplished by passing these exhaust gases through a jacket (whose outline is indicated by broken lines in FIG. 2) around the apparatus or by passing these gases through an auxiliary heat exchanger. If additional heating is needed to initiate evaporation, such heat can be supplied by an auxiliary heater (not shown) within the evaporation chamber 12. Such auxiliary heating is not required after evaporation is started and the heater would then be shut off. Also, the entire apparatus should be thoroughly insulated or lagged to keep heat losses to the atmosphere to a minimum except under conditions of location and operation where heating from the sun's rays and/or ambient air temperature would reduce significantly the heat loss from uninsulated apparatus.

In operation, the apparatus is so designed and mounted that the lower end of the riser 16 is always immersed in a source of brine or other solution to be distilled. Preferably this source is a naturally occurring source such as sea water, salt lakes and bays, or brackish wells. The compressor 22 is designed to maintain a subatomspheric pressure within the evaporation chamber 12. While this reduced pressure can comprise a wide variety of values, careful study indicates that a chamber pressure between 3.5 and 6 p.s.i. absolute is desirable for a unit of large commercial capacity. For the purpose of illustration hereinafter, a pressure of 5 p.s.i. is selected as suitable, but it should be understood that the particular choice of chamber pressure will depend upon local conditions at a specific installation.

At 5 p.s.i. absolute pressure, atmospheric pressure acting on the source will maintain a column of solution within the riser 16 and chamber 12 of about 21.7 vertical feet. The saturation or boiling temperature at this sea water pressure is about 162.2° F. The combined height of riser 16 and the chamber 12 above the solution source must exceed the above suggested height of solution and should be selected to maintain the surface 68 of solution within the chamber 12 at least several inches below the compressor inlet.

Figure 8:
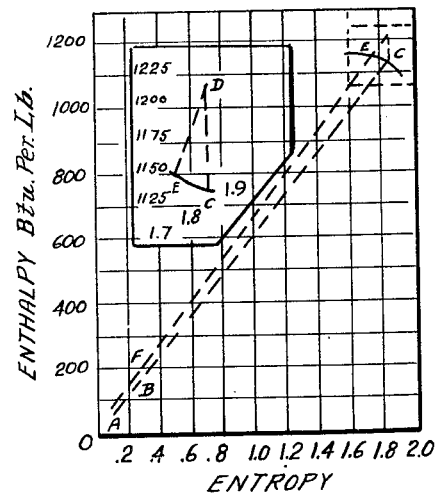
FIG. 8 is a diagram of a portion of the Mollier Diagram useful in explaining the operating cycle discussed hereinafter.
Figure 9:
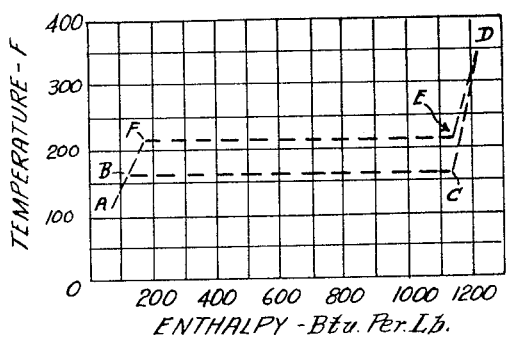
FIG. 9 is a Temperature-Enthalpy diagram for the same operating cycle.

In order to describe the operation of a specific operating example, reference will be made to FIGS. 8 and 9 which illustrate ideal thermodynamic processes at an absolute chamber pressure of 5 p.s.i. and a compressor delivery at atmospheric pressure. While it will not be possible to follow such ideal processes in practice, careful design will result in close approximation thereto.

In initiating evaporation, the compressor 22 is started to establish the desired subatmospheric pressure within the chamber 12 and to draw liquid from the source of solution to the level indicated at 68 by the action of atmospheric pressure on the source. Gases within this system are exhausted by venting, preferably by venting the condensate discharge pipe 20 at any convenient location.

Evaporation is initiated by the heat supplied by these compressed gases as they are vented and by utilizing the driver exhaust gases or an auxiliary heater as desired or necessary.

Referring again to FIGS. 2, 8 and 9, the incoming solution 70 is heated by the heat exchanger tubes to the saturation temperature indicated at B (FIGS. 8 and 9) and is then further heated to vaporization at point C. The resulting vapors are drawn into the compressor and compressed to atmospheric pressure, being thereby superheated to point D in the diagram. Ideally, this compression is known as a reversible adiabatic process which follows a constant entropy path C–D.

The compressed vapors pass through the space enclosed by the housing 44, enter the heat-exchanger tubes 14, and are then first cooled to 212° F. by heat transfer to the solution 70. This cooling path is shown in FIGS. 8 and 9 by the lines D–E. Condensation takes place within the tubes 14, the latent heat of vaporization being transmitted through the tube wall to the solution 70 within the chamber 12. After condensation at 212° F., the condensate will have the properties shown at point F in FIGS. 8 and 9. This condensate, which is now potable water, passes to the lower portion of the tubes 14, into the header 72 where the condensate is collected, and flows downwardly through the conduit 18 in riser 16 to the discharge pipe 20 from whence it is transported to a collection point. The condensate thus passes downwardly in counter current flow to the incoming feed solution which absorbs further heat from the condensate until the condensate passes to discharge at a temperature only slightly above that of the incoming feed solution.

From the foregoing description it will be noted that the compressor and its motor supply all the work necessary to maintain the process. The compressor thus raises the feed solution into the evaporation chamber 12, reduces the pressure within said chamber and hence the saturation temperature of the solution, and compresses the resulting vapor to a higher pressure thereby raising its temperature to furnish the heat within the exchanger necessary to main the process.

As vapors are withdrawn from the solution 70 within the evaporation chamber 12, the remaining solution become more concentrated and continuous operation requires that this concentrated solution be continuously removed from chamber 12. It is an important aspect of this invention that natural, gravity-induced currents are utilized continuously to remove and dilute the solution 70. As the solution 70 becomes more concentrated, its specific gravity increases and it will tend to fall through the passages between the heat-exchanger tubes 14 and downwardly through the riser 16, being constantly diluted by the less dense incoming feed solution. This diffusion downwardly will cause the concentrate to move continuously out of the system to the bottom of the riser 16. In addition to the desirable simplicity of this arrangement, it offers the further important advantage that the heat from the concentrate is largely transferred to the incoming solution and is therefore not entirely lost as is the case with most prior equipment.

Figure 5:
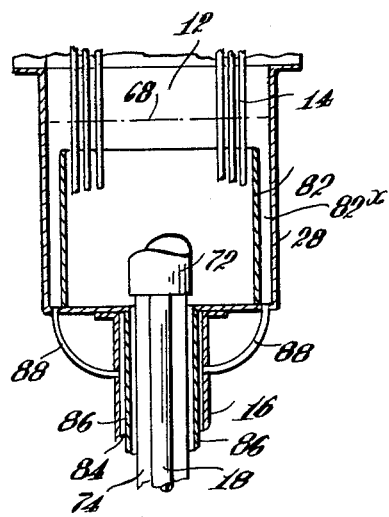
FIG. 5 is a partial diametrical vertical section illustrating a modification of the unit shown in FIG. 2.

An alternative arrangement for removing the concentrate from chamber 12 is shown in FIG. 5. Here an annular chamber 82$^x$ is formed by a cylindrical insert 82 which may be lightly fastened, but not necessarily sealed, to the base of the chamber shell 28. The top edge of the cylindrical insert 82 is located beneath the normal surface of the solution within the chamber 12. The riser 16 in this modification forms the outer shell of a second annular space 84, the inner wall being formed by another cylindrical insert 86. The top of space 84 is sealed by the bottom of the chamber wall 28, but at the bottom of the riser 16 this space is open to the supply water. The two annular spaces 82$^x$ and 84, are connected by one or more ducts 88. Incoming raw solution is drawn upwardly within the insert 86 and will tend to rise since it is heated by contact with the conduit 18 and the fins 74. Concentrated solution within the space 84 will be relatively cooler and heavier and will therefore fall, inducing circulation up through the cylindrical insert 86 into the chamber 12 and over the top of cylindrical insert 82, and thence downwardly through ducts 88 into space 84 and so downwardly to the supply source. The riser 16 should be kept shorter than insert 86 to reduce to a minimum the possibility of drawing the concentrate back into the apparatus.

Figure 6:
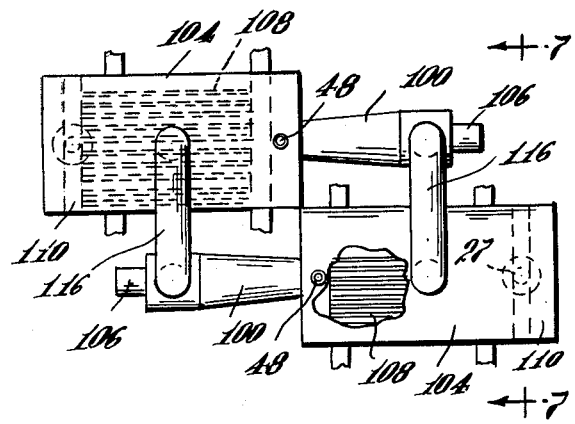
FIG. 6 is a plan view of another embodiment of this invention.
Figure 7:
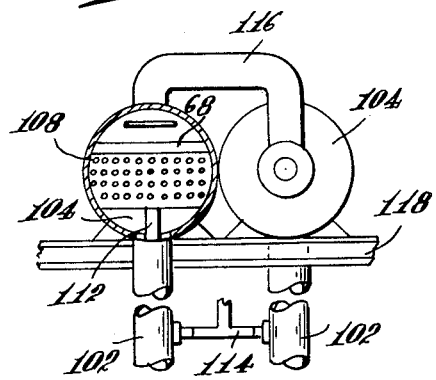
FIG. 7 is a section taken on the line 7—7 of FIG. 6.

A further modification of this invention is shown in FIGS. 6 and 7 which show, in plan and elevation respectively, a paired arrangement of two distillation units. This modification has the advantages that the heat-exchanger tubes are straight for easy installation and maintenance, that the surface area of solution within the evaporation chamber is increased and the depth decreased to augment the evaporation rate, and the paired arrangement conserves space to provide a compact apparatus.

In this modification, compressors 100 draw raw feed solution through risers 102 into horizontal cylindrical evaporation chambers 104 by maintaining a vacuum in said chambers. The compressors 100, driven by motors 106, feed compressed vapors into heat exchanger tubes 108 immersed in the solution within the evaporation chamber of the complementary unit. These compressed vapors give up their heat to the solution, condense, pass to a common header 110 from whence the condensate passes to conduit 112 which descends within riser 102 to a common condensate delivery pipe 114. The pipes 116 conduct the vapors from each evaporation chamber to its respective compressor. As in the previous embodiments described, adjustable vacuum breaker valves 48 are provided on the delivery side of each compressor to maintain the desired pressure. The paired units are carried by a support 118 which can be either fixed, movable, or floating as desired.

From the foregoing description it will be apparent that improved distillation equipment is provided which is particularly useful for obtaining potable water from naturally occurring salt water bodies. The energy supplied to the apparatus is utilized to a maximum with most of the friction losses absorbed within the system, while losses due to radiation, conduction and convection are reduced to a minimum. While in many localities the apparatus will need to be carefully insulated, the process is carried out at a sufficiently low temperature to make it possible, in warm localities, to expose parts of the apparatus without insulation. Furthermore, solution concentration is maintained at a uniform low value and evaporation is carried out at a temperature sufficiently low so that the serious problem of scaling of the heat exchanger tubes is reduced to a minimum. Prior published studies have shown that maximum rates of heat transfer occur with a temperature difference across the heat exchanger of about 50° F. and the apparatus herein described provides this differential with minimum tube scaling. Also the difficult problem of sealing evaporator chambers for very low pressure is advantageously accomplished in the embodiments shown in FIGS. 1 to 5 since only two simple, rugged removable seals are required. Since the compressor delivers compressed vapors at substantially atmospheric pressure, no serious sealing problems arise in the housings which conduct these vapors to the heat exchanger.

The apparatus shown in FIGS. 1 to 5 is further advantageously designed for easy fabrication, installation and maintenance. All of the parts making up each unit, as shown in FIGS. 1 to 5, are concentric about a common vertical axis and can be easily assembled and disassembled by means of a single crane.

In all of the embodiments described, the apparatus is designed for continuous flow and is completely self-regulating. If the rate of evaporation within the evaporation chamber exceeds either the capacity of the compressor or the demand for distilled water, the pressure within the evaporation chamber will rise thereby decreasing the solution level within the chamber and raising the saturation temperature. This increased temperature and decreased heat transfer area will automatically reduce the rate of evaporation to the desired level. If the pressure at the delivery end of the compressor should fall below that desired for efficient operation, vacuum breaker control valves 48 will open to admit air to raise this pressure to atmospheric.

Figure 1:
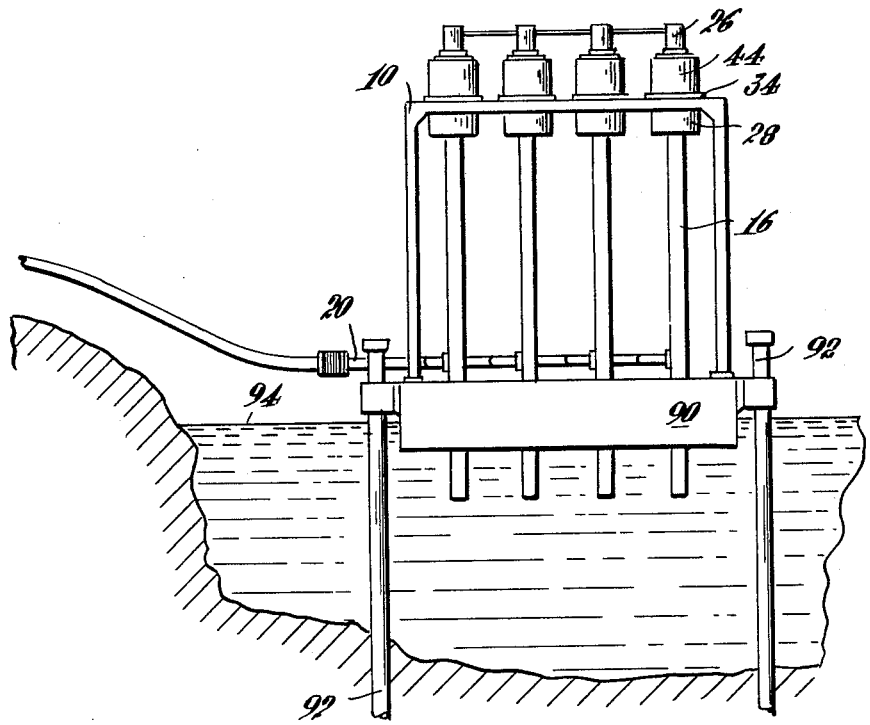
FIG. 1 is a schematic side elevation showing a plurality of distilling units mounted in place on a floating platform over a source of salt water.
Figure 3:
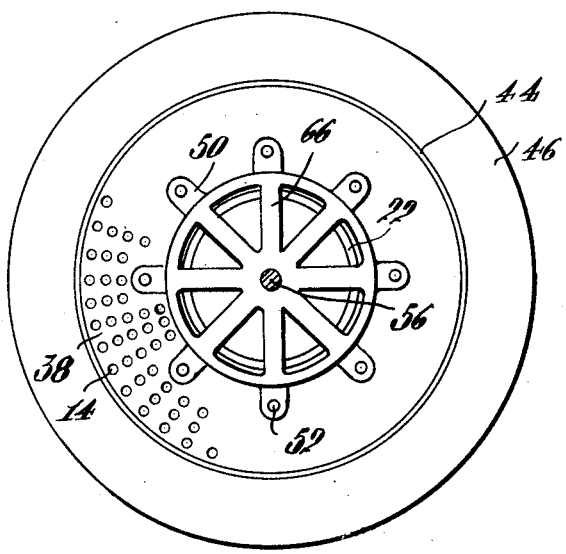
FIG. 3 is a section taken on the line 3—3 of FIG. 2.
Figure 4:
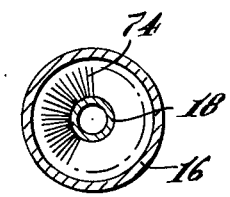
FIG. 4 is a section taken on the line 4—4 of FIG. 2.

While units according to this invention may be designed for any desired commercial capacity, calculations indicate that a single unit capacity of about 50 to 75 gallons per minute is most practical in order to keep the unit reasonably compact and manageable in size. Thus for larger capacity it is believed most desirable to mount several smaller units in parallel. Such an arrangement is illustrated in FIG. 1 wherein a floating base 90, slidably fixed to piling 92, carries a plurality of distilling units over a natural salt water body 94.

While the invention, as herein specifically described, is primarily intended for use in extracting potable water from normal sea water, it is contemplated that it may be employed for so extracting solvent from any solution wherein the dissolved substances are such that they do not volatilize at the pressures and temperatures involved in the practice of the method and by the operation of the apparatus as above described, and, for convenience, all such solutions are herein considered as included under the general term of "brines." Furthermore, it is obvious that while the risers are conveniently vertical, they can be mounted at any desired inclined angle and that the compressor can deliver vapors at any desired pressure above the pressure within the evaporation chamber.

It should be understood that the foregoing description is for the purpose of illustration only and that the invention includes all modifications falling within the scope of the appended claims.

I claim:

1. Distilling apparatus adapted for continuous separation of solvent from a brine by vapor compression, said apparatus comprising a riser open at both ends, the lower end of said riser being below the surface of a naturally occurring source of brine of large volume relative to the capacity of the apparatus, an evaporation chamber mounted over said riser, the top of the riser opening to the bottom of said chamber, a conduit leading downwardly from said chamber into the riser, a compressor having inlet means for receiving vapors from said chamber, said compressor being adapted to maintain a subatmospheric pressure in said chamber and to compress vapors therefrom, the combined height of said riser and evaporation chamber above the surface of said source being greater than the height of the column of brine which can be maintained therein by atmospheric pressure acting on the source, heat-exchanger means in said chamber adapted to receive compressed vapors from said brine and having a substantial portion thereof adapted to be submerged in the brine within the chamber, said exchanger having outlet means feeding condensed vapors to the upper end of said conduit, discharge means connected to the lower end of said conduit, means for driving said compressor, a vapor chamber mounted over the evaporation chamber, a load-bearing septum adapted to support the entire apparatus and having said chambers mounted on opposite sides thereof, and means external to the apparatus adapted to support the septum as the sole support for the apparatus, said compressor being mounted to said septum and being located within the vapor chamber, said heat-exchanger comprising tubes the upper ends of which extend through said septum and are sealed thereto in communication with said vapor chamber, said compressor having inlet means communicating centrally through the septum with the evaporation chamber and having discharge means communicating with said vapor chamber, said riser being adapted to return concentrated brine from said evaporation chamber to said source in liquid contact with the column of brine therein by means of natural, gravity-induced currents.

2. Distilling apparatus according to claim 1 wherein said septum, said upper compression and lower evaporation chambers, said compressor and said heat-exchanger have a common vertical axis.

References Cited in the file of this patent

UNITED STATES PATENTS

| | | |
|---|---|---|
| 1,966,938 | Stone | July 17, 1934 |
| 2,006,985 | Claude et al. | July 2, 1935 |
| 2,446,880 | Kleinschmidt | Aug. 10, 1948 |
| 2,449,587 | Chambers | Sept. 21, 1948 |
| 2,469,122 | Latham | May 3, 1949 |
| 2,619,453 | Andersen | Nov. 25, 1952 |

OTHER REFERENCES

Latham: Petroleum Refiner, vol. 24, No. 12, December 1945, pages 127–130.

Maxim: Marine Eng., March 1954, pages 59–61.

Perry: "Chemical Engineering Handbook," 3rd edition, 1950, page 502.

Badger Manufacturing Co., "Badges-Hickman Centrifugal Distillation Techniques and Equipment," Progress Report No. 12.